United States Patent
Mamiya (10) Patent No.: US 8,407,490 B2
(45) Date of Patent: Mar. 26, 2013

(54) POWER SUPPLY HAVING AN AUXILIARY SWITCH TO CONTROL A RELAY SWITCH CONNECTED IN PARALLEL TO A MAIN SWITCH FOR CONTINUING SUPPLY POWER WHEN THE MAIN SWITCH IS OFF

(75) Inventor: Mitsunobu Mamiya, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 494 days.

(21) Appl. No.: 12/568,690

(22) Filed: Sep. 29, 2009

(65) Prior Publication Data
US 2010/0218008 A1    Aug. 26, 2010

(30) Foreign Application Priority Data
Feb. 24, 2009   (JP) .................................. 2009-040666

(51) Int. Cl.
*G06F 1/00* (2006.01)
(52) U.S. Cl. .......................................... 713/300; 714/14
(58) Field of Classification Search .................. 713/300; 714/14
See application file for complete search history.

(56) References Cited

U.S. PATENT DOCUMENTS

| | | | | |
|---|---|---|---|---|
| 6,369,466 B1 * | 4/2002 | Murphy | ........................ | 307/125 |
| 6,661,123 B2 * | 12/2003 | Hsu | ............................... | 307/141 |
| 7,340,626 B2 * | 3/2008 | Maitani | ......................... | 713/323 |
| 2001/0039626 A1 * | 11/2001 | Jauert | ............................. | 713/300 |
| 2003/0204761 A1 * | 10/2003 | D'Alessio | ..................... | 713/320 |

FOREIGN PATENT DOCUMENTS

| | | |
|---|---|---|
| JP | 11-184573 A | 7/1999 |
| JP | 2006-044228 A | 2/2006 |

OTHER PUBLICATIONS

Power Semiconductor Applications, Jun. 29, 2004, Philips Semiconductors, chapter 2, p. 107.*

* cited by examiner

*Primary Examiner* — Thomas Lee
*Assistant Examiner* — Xuxing Chen
(74) *Attorney, Agent, or Firm* — Sughrue Mion, PLLC (57) ABSTRACT

There is provided a power supply device including: a main power switch; an auxiliary power switch; a power supplying switch; a relay having a relay contact and an excitation coil that, in an excited state, closes the relay contact, and, when the excited state is cancelled, opens the relay contact; a control section effecting control such that, when the main power switch is in an on position and the auxiliary power switch is in an on/off position, the power supplying switch is turned on/off; and a driving section that drives the relay such that, when the main power switch is in an on position and the auxiliary power switch is in an on position, the excitation coil is excited and maintain the excited state, and, when the auxiliary power switch is in an off position, cancels the excited state of the excitation coil.

8 Claims, 7 Drawing Sheets

POWER SUPPLY HAVING AN AUXILIARY SWITCH TO CONTROL A RELAY SWITCH CONNECTED IN PARALLEL TO A MAIN SWITCH FOR CONTINUING SUPPLY POWER WHEN THE MAIN SWITCH IS OFF

CROSS-REFERENCE TO RELATED APPLICATION

This application claims priority under 35 USC 119 from Japanese Patent Application No. 2009-040666 filed on Feb. 24, 2009.

BACKGROUND

1. Technical Field

The present invention relates to a power supply device.

2. Related Art

There is conventionally known an image forming device that has a storage device and at which triacs are provided parallel to a power supply SW with respect to a power supply line to a DC power supply circuit, and the driving control thereof is carried out by the CPU of a control substrate.

SUMMARY

An object of the present invention is to provide a power supply device that, as compared with conventional techniques, can more reliably continue the supply of a power supply to a power supply destination even when an irregular operation is carried out at the time of stopping the supply of the power supply.

In order to achieve the above object, the present invention provides a power supply device including:

a main power switch having on and off positions, and is connected to a power supply;

an auxiliary power switch having on and off positions;

a power supplying switch connected in series to the main power switch, between the main power switch and a power supply destination;

a relay having a relay contact connected in parallel to the main power switch, and an excitation coil that, in an excited state, closes the relay contact, and, when the excited state is cancelled, opens the relay contact;

a control section effecting control such that, when the main power switch is in an on position and the auxiliary power switch is in an on position, the power supplying switch is turned on, and, when the auxiliary power switch is in an off position, the power supplying switch is turned off; and a driving section that drives the relay such that, when the main power switch is in an on position and the auxiliary power switch is in an on position, the excitation coil is excited and maintain the excited state, and, when the auxiliary power switch is in an off position, cancels the excited state of the excitation coil.

BRIEF DESCRIPTION OF THE DRAWINGS

An exemplary embodiment of the present invention will be described in detail based on the following figures, wherein.

DETAILED DESCRIPTION

An exemplary embodiment in a case in which the present invention is applied to the power supply device of an image forming device will be described hereinafter.

Figure 1:
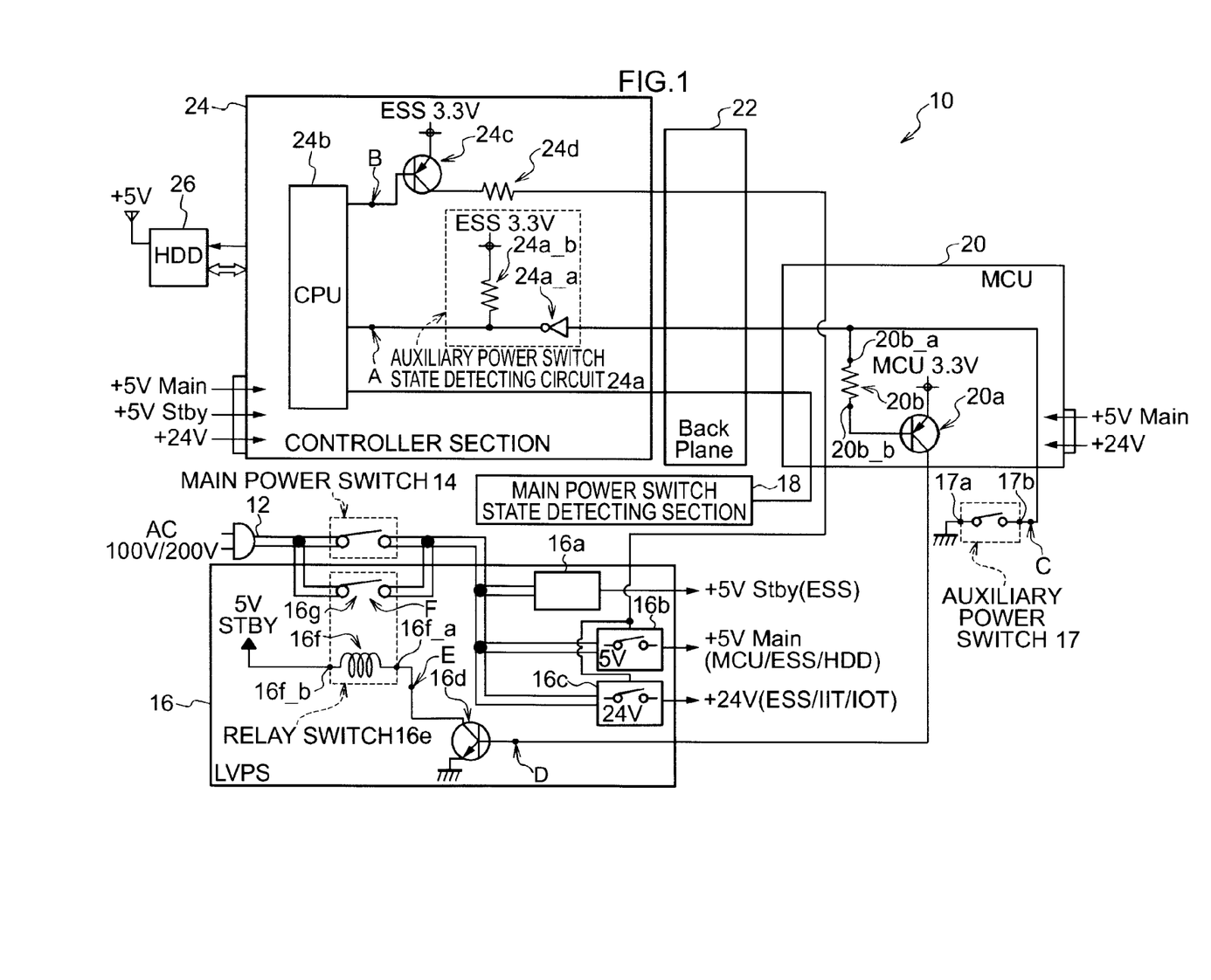
FIG. 1 is a schematic structural drawing of a power supply device in the present exemplary embodiment.

FIG. 1 is a schematic structural drawing of a power supply device 10 of an image forming device in the present exemplary embodiment. Main portions of the present invention will be described in the present exemplary embodiment.

As shown in FIG. 1, electric power from a commercial power supply is supplied to the power supply device 10 by a power supply cord 12 from an outlet for supplying electric power of a commercial power supply (e.g., AC 100V/200V). Namely, AC voltage is inputted to the power supply device 10 from an AC power supply.

The power supply device 10 has the power supply cord 12, a main power switch 14 having on and off positions, a DC power supply generating section (LVPS) 16, an auxiliary power switch 17 having on and off positions, a main power switch state detecting section 18, a main controller unit (MCU) 20, a backplane 22, and a controller section (ESS) 24.

One end 14a of the main power switch 14 is connected to the power supply via the power supply cord 12. Another end 14b is connected to a first DC power supply generating circuit 16a, a second DC power supply generating circuit 16b and a third DC power supply generating circuit 16c of the DC power supply generating section 16 that will be described in detail later. Namely, the main power switch 14 is in an on position and off, and is connected to the power supply. Due thereto, when the main power switch 14 is in the on position, AC voltage (AC power supply) can be supplied to the first DC power supply generating circuit 16a, the second DC power supply generating circuit 16b and the third DC power supply generating circuit 16c.

The DC power supply generating section 16 has the first DC power supply generating circuit 16a, the second DC power supply generating circuit 16b, the third DC power supply generating circuit 16c, an NPN transistor 16d and a relay switch 16e.

The first DC power supply generating circuit 16a converts supplied AC voltage into DC voltage (+5V), and outputs it to the controller section 24. Note that, in the present exemplary embodiment, this DC voltage is the voltage at the time of a standby mode.

The second DC power supply generating circuit 16b is structured to include a switching element. The second DC power supply generating circuit 16d is connected via a resistor 24d to the collector terminal of a PNP transistor 24c that will be described in detail later. When a signal (LOW) expressing on is outputted from the PNP transistor 24c that outputs a signal expressing on or off in accordance with the state of a signal outputted from a CPU (Central Processing Unit) 24b, the second DC power supply generating circuit 16b converts the supplied AC voltage into DC voltage (+5V), and outputs it to power supply destinations such as the main controller unit 20, an HDD 26 that serves as a storage section that stores information, the controller section 24, and the like. Note that, in the present exemplary embodiment, this DC voltage is for application (supply) to loads of the control system at the time of a normal mode. The power supply destinations are, for example, the loads of the control system. Further, the second DC power supply generating circuit 16*b* is connected in series to the main power switch 14 between the main power switch 14 and the power supply destinations.

The third DC power supply generating circuit 16*c* is structured to include a switching element. The third DC power supply generating circuit 16*c* is connected via the resistor 24*d* to the collector terminal of the PNP transistor 24*c*. When a signal (LOW) expressing on is outputted from the PNP transistor 24*c*, the third DC power supply generating circuit 16*c* converts the supplied AC voltage into DC voltage (+24V), and outputs it to power supply destinations such as the controller section 24, an image reading device (not shown) that acquires image information by reading an image from an original, an image outputting device (not shown) that forms and outputs an image on a sheet, and the like. Note that, in the present exemplary embodiment, this DC voltage is for application (supply) to loads of the driving system at the time of the normal mode. The power supply destinations are, for example, the loads of the driving system. Further, the third DC power supply generating circuit 16*c* is connected in series to the main power switch 14 between the main power switch 14 and the power supply destinations.

Here, when a signal expressing on is inputted from the transistor 24*c* via the resistor 24*d* to the second DC power supply generating circuit 16*b* and the third DC power supply generating circuit 16*c*, the states of the second DC power supply generating circuit 16*b* and the third DC power supply generating circuit 13*c* are made to be on. When a signal expressing off is inputted from the transistor 24*c* via the resistor 24*d* to the second DC power supply generating circuit 16*b* and the third DC power supply generating circuit 16*c*, the states of the second DC power supply generating circuit 16*b* and the third DC power supply generating circuit 16*c* are made to be off.

Note that the second DC power supply generating circuit 16*b* and the third DC power supply generating circuit 16*c* correspond to the power supplying switches of the present invention.

The emitter terminal of the NPN transistor 16*d* is grounded. The base terminal of the NPN transistor 16*d* is connected to the collector terminal of a PNP transistor 20*a* that will be described in detail later. Further, the collector terminal of the NPN transistor 16*d* is connected to one terminal 16*f*__*a* of an excitation coil 16*f* of the relay switch 16*e*.

The relay switch 16*e* has the excitation coil 16*f* and a relay contact 16*g*.

The relay contact 16*g* is electrically connected in parallel to the main power switch 14 via wires.

The first DC power supply generating circuit 16*a* is connected to another end 16*f*__*b* of the excitation coil 16*f*. DC voltage (+5V) can thereby be applied to the excitation coil 16*f* by the first DC power supply generating circuit 16*a*. When current flows to the excitation coil 16*f*, the excitation coil 16*f* is set in an excited state. In the excited state, the excitation coil 16*f* closes the relay contact 16*g*, and when the excited state is cancelled, the excitation coil 16*f* opens the relay contact 16*g*.

Note that the relay switch 16*e* corresponds to the relay of the present invention.

One end 17*a* of the auxiliary power switch 17 is grounded, and another end 17*b* is connected to one end 20*b*__*a* of a resistor 20*b*.

The main power switch state detecting section 18 is for detecting the state of the main power switch 14, and is connected to the CPU 24*b*. When the main power switch 14 is in the on position, the main power switch state detecting section 18 outputs to the CPU 24*b* a signal (e.g., a HI signal) expressing that the main power switch 14 is in the on position. When the main power switch 14 is in the off state, the main power switch state detecting section 18 outputs to the CPU 24*b* a signal (e.g., a LOW signal) expressing that the main power switch 14 is in the off state.

The main controller unit 20 has the PNP transistor 20*a* and the resistor 20*b*.

The emitter terminal of the PNP transistor 20*a* is connected to a power supply of 3.3 V, and the base terminal of the PNP transistor 20*a* is connected to another end 20*b*__*b* of the resistor 20*b*. Further, an auxiliary power switch state detecting circuit 24*a* of the controller section 24 is connected to the one end 20*b*__*a* of the resistor 20*b*.

The controller section 24 includes the auxiliary power switch state detecting circuit 24*a*, the CPU 24*b*, the PNP transistor 24*c*, and the resistor 24*d*.

The auxiliary power switch state detecting circuit 24*a* has an inverting circuit 24*a*__*a* and a resistor 24*a*__*b* for pull-up whose one end is connected to a power supply of 3.3 V.

The input terminal of the inverting circuit 24*a*__*a* is connected to the one end 20*b*__*a* of the resistor 20*b*. The inverting circuit 24*a*__*a* inverts the state of the signal inputted to the input terminal, and outputs it from the output terminal. The output terminal of the inverting circuit 24*a*__*a* is connected to the CPU 24*b* and the other end of the resistor 24*a*__*b* for pull-up.

Accordingly, when the auxiliary power switch 17 is in an on position and is set in the on position, the auxiliary power switch state detecting circuit 24*a* of the present exemplary embodiment outputs, to the CPU 24*b*, a signal (HI) expressing that the auxiliary power switch 17 is in the on position. Further, when the auxiliary power switch 17 is in an off position and is set in the off state, the auxiliary power switch state detecting circuit 24*a* of the present exemplary embodiment outputs, to the CPU 24*b*, a signal (LOW) expressing that the auxiliary power switch 17 is in the off state.

The CPU 24*b* governs the operations of the overall image forming device. The CPU 24*b* is connected to the base of the PNP transistor 24*c*. When, for example, a signal (HI) expressing that the auxiliary power switch 17 is in the on position is inputted from the auxiliary power switch state detecting circuit 24*a*, the CPU 24*b* of the present exemplary embodiment outputs a LOW signal to the base terminal of the PNP transistor 24*c* so that DC power supply is outputted from the second DC power supply generating circuit 16*b* and the third DC power supply generating circuit 16*c*. Further, when, for example, a signal (LOW) expressing that the auxiliary power switch 17 is in the off state is inputted from the auxiliary power switch state detecting circuit 24*a*, the CPU 24*b* of the present exemplary embodiment carries out respective saving operations that are needed for saving information for storing in the HDD 26 and turning the power supply off.

A power supply of 3.3 V is connected to the emitter terminal of the PNP transistor 24*c*. Further, as mentioned above, the second DC power supply generating circuit 16*b* and the third DC power supply generating circuit 16*c* are connected via the resistor 24*d* to the collector terminal of the PNP transistor 24*c*. Accordingly, when a LOW signal is inputted from the CPU 24*b* to the base terminal of the PNP transistor 24*c*, the second DC power supply generating circuit 16*b* and the third DC power supply generating circuit 16*c* respectively convert AC voltages into DC voltages, and supply them to the respective power supply destinations.

Further, the CPU 24b executes processings for causing information to be stored in the HDD 26 that serves as a storage section.

Figure 6:
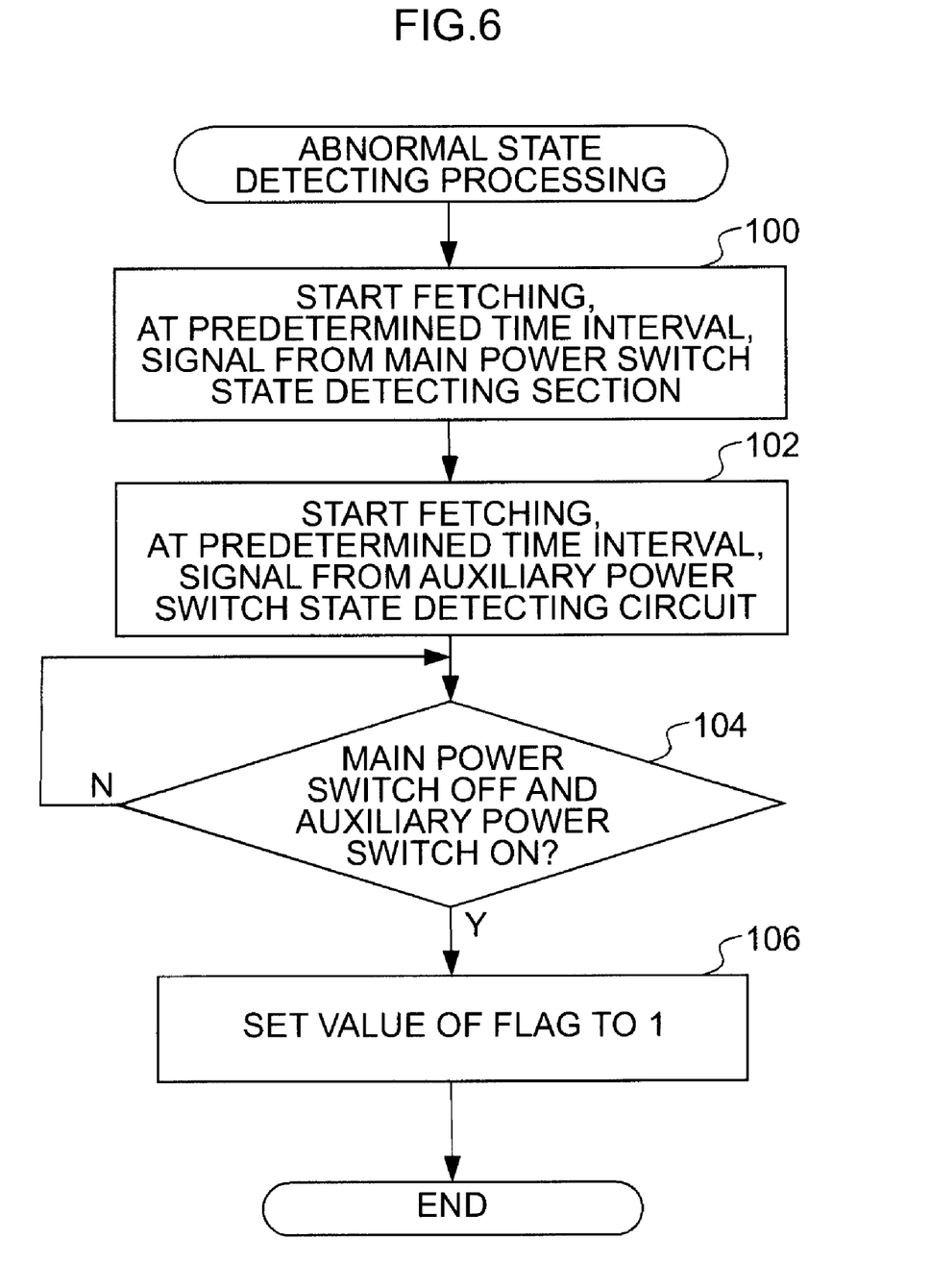
FIG. 6 is a flowchart of abnormal state detecting processing that is executed by a controller section of the present exemplary embodiment.

When the state expressed by the signal from the auxiliary power switch state detecting circuit 24a is a state expressing that the auxiliary power switch 17 is in the on position and the state expressed by the signal from the main power switch state detecting section 18 is that the main power switch 14 has changed from the on position to the off state, the CPU 24b judges that an irregular operation has been carried out, and executes processing that effects control such that information, that expresses that the auxiliary power switch 17 was in the on position and the main power switch 14 was in an off position, is stored in a non-volatile memory (not shown). When, for example, the state expressed by the signal from the auxiliary power switch state detecting circuit 24a is a state expressing that the auxiliary power switch 17 is in the on position and the state expressed by the signal from the main power switch state detecting section 18 is that the main power switch 14 has changed from the on position to the off state, the CPU 24b executes processing that sets the value of a predetermined flag in the memory (a flag at which 0 is set as an initial value) to 1. When this flag is set to 1, it is judged that the auxiliary power switch 17 is in the on position and the main power switch 14 has been in an off position. Namely, when the auxiliary power switch 17 is in the on position and the main power switch 14 has been in an off position, the CPU 24b of the present exemplary embodiment executes processing that effects control so as to store information that expresses that the auxiliary power switch 17 was in the on position and the main power switch 14 was in an off position. Note that the abnormal state detecting processing shown in FIG. 6 is an example of such processing. This abnormal state detecting processing will be described in detail later.

Further, when the state expressed by the signal from the main power switch state detecting section 18 is a state expressing that the main power switch 14 is in the on position and the state expressed by the signal from the auxiliary power switch state detecting circuit 24a is that the auxiliary power switch 17 has changed from the off state to the on position, the CPU 24b effects control so as to, when the above-described information (information expressing that the auxiliary power switch 17 was in the on position and the main power switch 14 was in an off position) has been stored in the memory, give notice of information expressing that the auxiliary power switch 17 was in the on position and the main power switch 14 was in an off position. For example, when there is a state expressing that the main power switch 14 is in the on position and the state expressed by the signal from the auxiliary power switch state detecting circuit 24a is that the auxiliary power switch 17 has changed from the off state to the on position, when the above-described information expressing that the auxiliary power switch 17 was in the on position and the main power switch 14 was in an off position has been stored in the memory, the CPU 24b either executes processing so as to effect control such that the message "The auxiliary power switch 17 was in the on position and the main power switch 14 was in an off position." is displayed on a display device (not shown), or executes processing so as to control a voice outputting device (not shown) such that a voice stating "The auxiliary power switch 17 was in the on position and the main power switch 14 was in an off position." is outputted, as information expressing that the auxiliary power switch 17 was in the on position and the main power switch 14 was in an off position. Namely, when the main power switch 14 is in the on position and the auxiliary power switch 17 is in an on position and the second DC power supply generating circuit 16b and the third DC power supply generating circuit 16c that serve as power supplying switches are set in on positions, when the above-described information has been stored, processing is executed so as to effect control such that notice is given of information expressing that the auxiliary power switch 17 was in the on position and the main power switch 14 was in an off position. Note that the CPU 24b corresponds to the processing executing device of the present invention.

Figure 2:
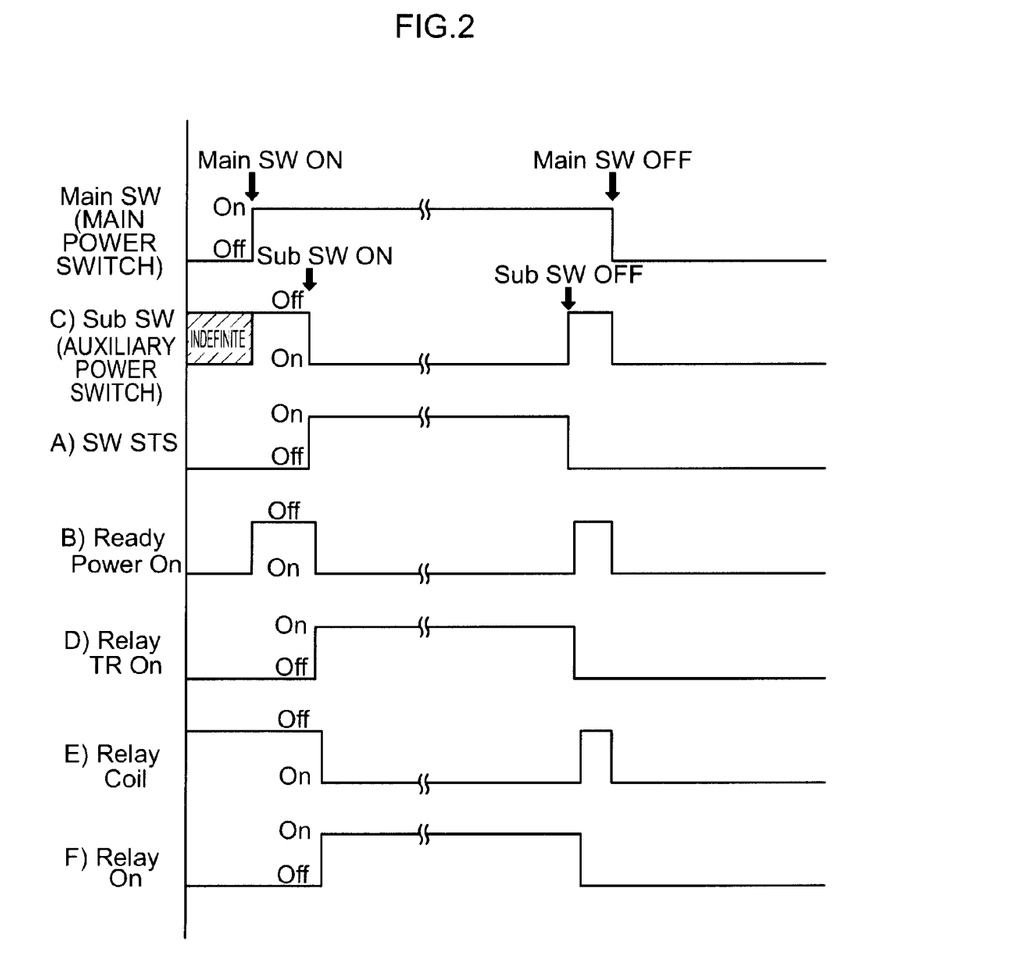
FIG. 2 is a sequence diagram when power switches are operated in the correct order.
Figure 3:
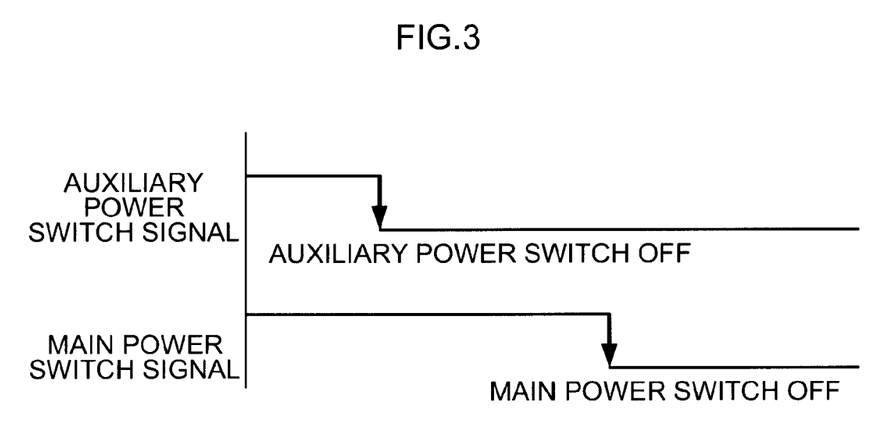
FIG. 3 is a drawing showing the states of signals when the power switches are operated in the correct order.

Operation of the power supply device 10 of the present exemplary embodiment will be described next. FIG. 2 is a drawing showing the states of signals of the respective regions of A, B, C, D, E and F shown in FIG. 1 when, as shown in FIG. 3, the main power switch 14 is in the on position and the auxiliary power switch 17 is in an on position, and then, the auxiliary power switch 17 is in an off position when the main power switch 14 is in the on position, i.e., when normal operation is carried out. As shown in FIG. 2, the controller section 24 (more specifically, the auxiliary power switch state detecting circuit 24a, the CPU 24b, the transistor 24c and the resistor 24d) effects control such that, when the main power switch 14 is in the on position and the auxiliary power switch 17 is in an on position, the second DC power supply generating circuit 16b and the third DC power supply generating circuit 16c that serve as power supplying switches are turned on, and, when the auxiliary power switch 17 is in an off position, the second DC power supply generating circuit 16b and the third DC power supply generating circuit 16c are turned off. Note that the auxiliary power switch state detecting circuit 24a, the CPU 24b, the transistor 24c and the resistor 24d correspond to the control section of the present invention.

Further, as shown in FIG. 2, the main controller unit 20 (more specifically, the transistor 20a and the resistor 20b) and the transistor 16d drive the relay switch 16e such that, when the main power switch 14 is in the on position and the auxiliary power switch 17 is in an on position, the relay contact 16g is closed due to the excitation coil 16f being excited and the excited state being maintained, and, when the auxiliary power switch 17 is in an off position, the excited state of the excitation coil 16f is cancelled. Note that the main controller unit 20 (more specifically, the transistor 20a and the resistor 20b) and the transistor 16d correspond to the driving section of the present invention.

Figure 4:
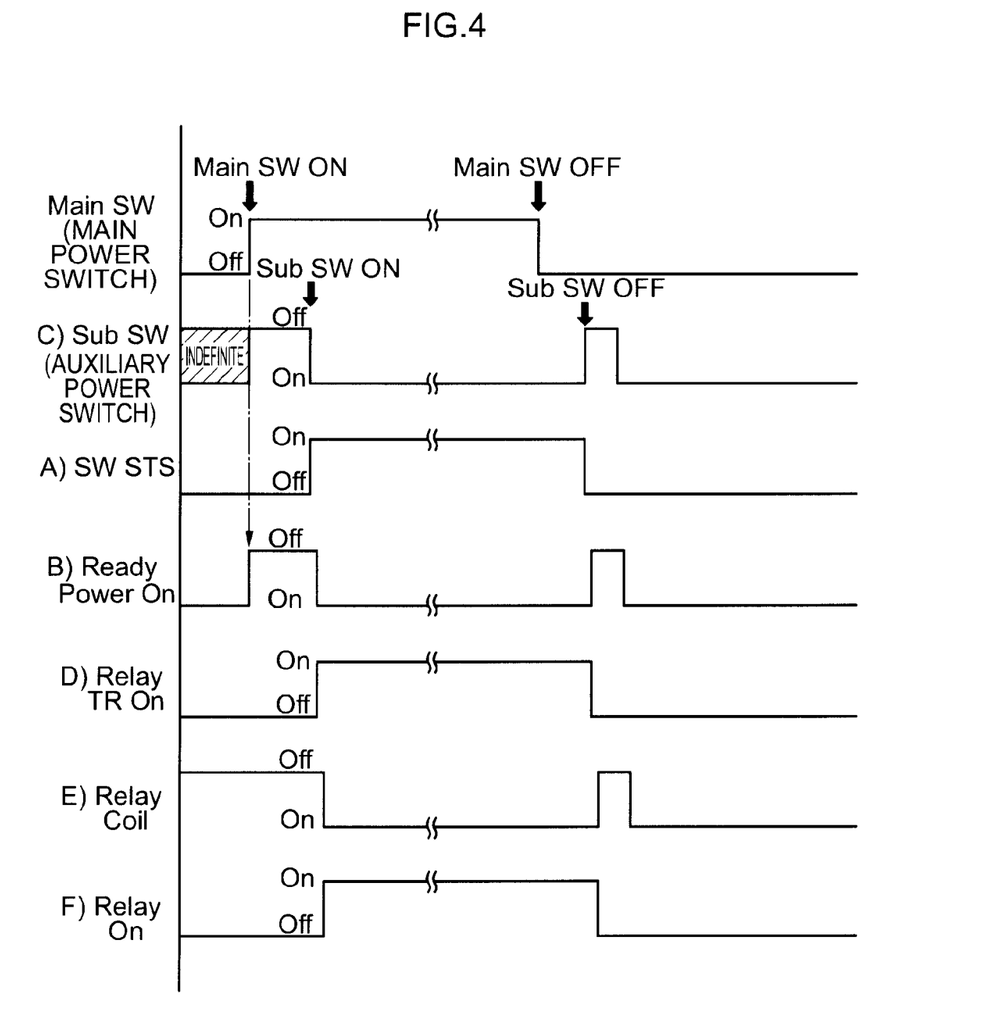
FIG. 4 is a sequence diagram when the power switches are operated in an incorrect order.
Figure 5:
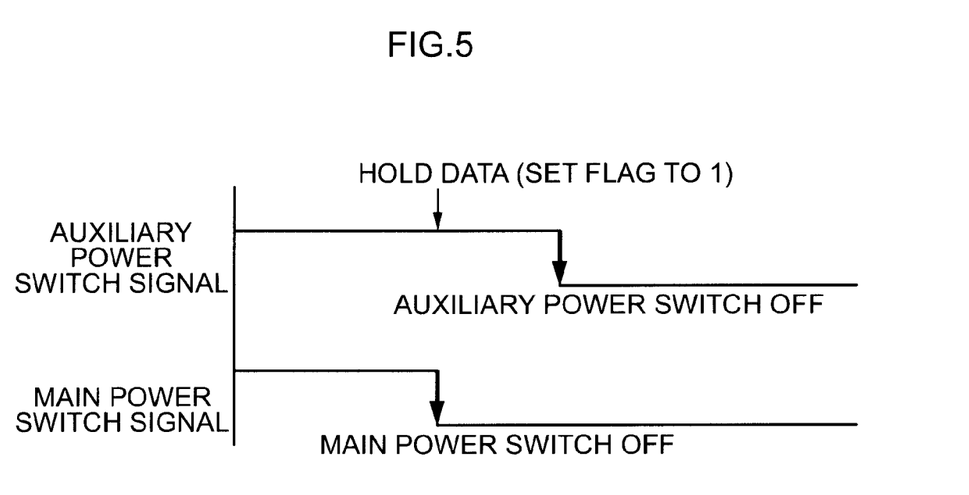
FIG. 5 is a drawing showing the states of signals when the power switches are operated in an incorrect order.

FIG. 4 is a drawing showing the states of the signals at the respective regions of A, B, C, D, E and F shown in FIG. 1 when, as shown in FIG. 5, the main power switch 14 is in the on position and the auxiliary power switch 17 is in an on position, and then, the main power switch 14 is in an off position when the auxiliary power switch 17 is in the on position, i.e., when an irregular operation (when there is a mistake in the order of the switches that are in an off position when the power supply is turned off) is carried out.

As shown in FIG. 4, even when an irregular operation is carried out, when the auxiliary power switch 17 is in the on position, the excitation coil 16f is excited and the excited state is maintained, and the relay contact 16g is closed. Therefore, even if the main power switch 14 is in an off position, the supply of power to the power supply destinations is continued.

Abnormal state detecting processing, that is an example of processing executed by the CPU 24b, will be described next with reference to FIG. 6. Note that execution of this abnormal state detecting processing is started when, for example, the main power switch 14 is in the on position and the auxiliary power switch 17 is in an on position and the mode becomes the normal mode.

First, in step 100, fetching at predetermined time intervals of the signal from the main power switch state detecting section 18 is started. Due thereto, from then on, the signal from the main power switch state detecting section 18 is fetched at predetermined time intervals.

In next step 102, fetching at predetermined time intervals of the signal from the auxiliary power switch state detecting circuit 24*a* is started. Due thereto, from then on, the signal from the auxiliary power switch state detecting circuit 24*a* is fetched at predetermined time intervals.

In next step 104, it is judged whether the signal from the auxiliary power switch state detecting circuit 24*a* expresses that the auxiliary power switch 17 is in the on position and the signal from the main power switch state detecting section 18 expresses that the main power switch 14 is in the off state.

In step 104, if it is judged that the signal from the auxiliary power switch state detecting circuit 24*a* expresses that the auxiliary power switch 17 is in the off state or the signal from the main power switch state detecting section 18 expresses that the main power switch 14 is in the on position, a similar judgment is carried out again.

On the other hand, in step 104, if it is judged that the signal from the auxiliary power switch state detecting circuit 24*a* expresses that the auxiliary power switch 17 is in the on position and the signal from the main power switch state detecting section 18 expresses that the main power switch 14 is in the off state, the routine moves on to subsequent step 106.

In step 106, the value of the flag is set to 1. Then, the abnormal state detecting processing ends.

The power supply device 10 of the present exemplary embodiment has been described above.

Figure 7:
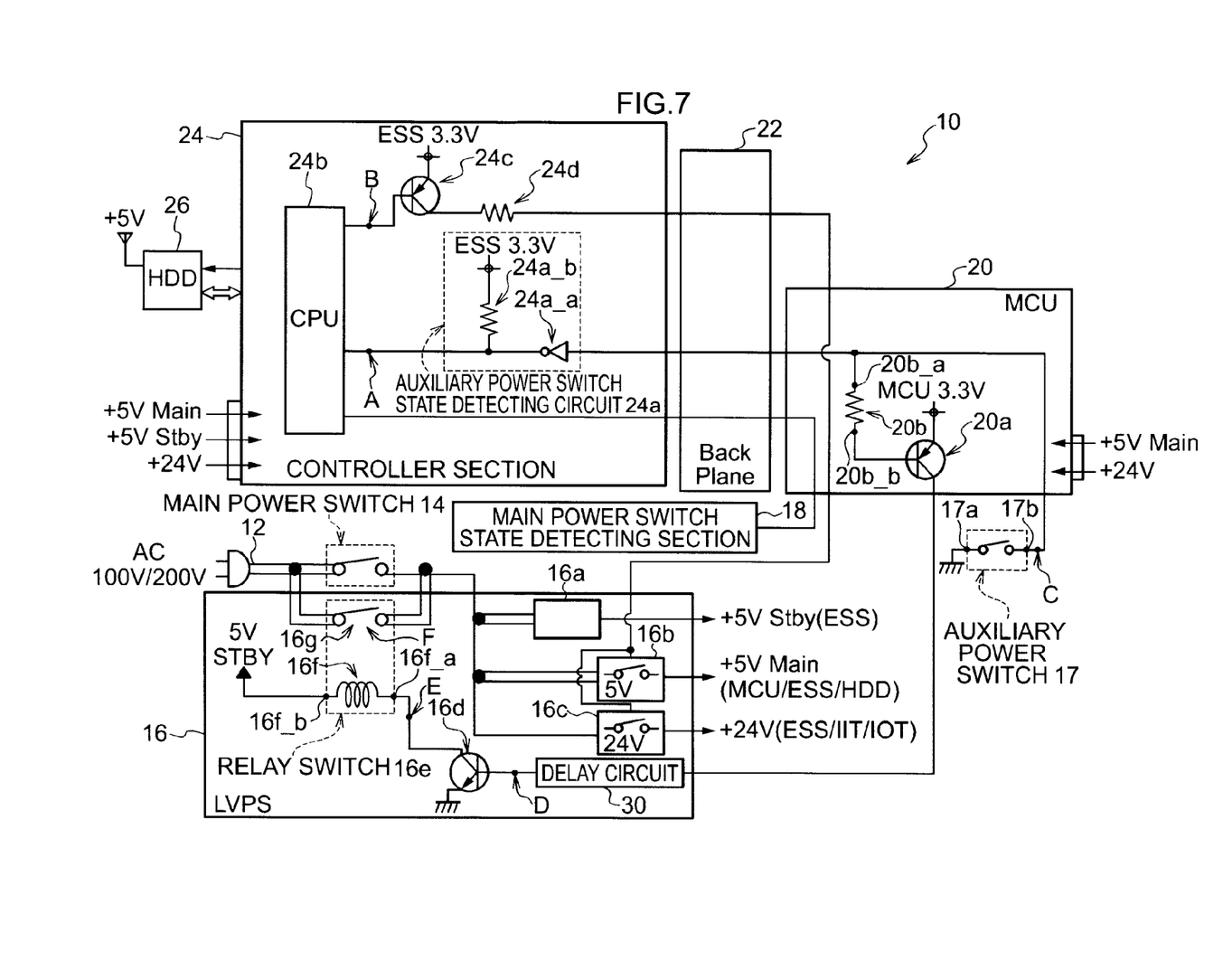
FIG. 7 is a drawing showing a modified example.

Note that, as shown in FIG. 7, a delay circuit 30, that outputs the state of the inputted signal with a delay of a predetermined time, may be provided between the transistor 16*d* and the transistor 20*a*. Note that this time may be set so as to be, for example, the time needed when carrying out respective saving operations needed for saving information for storing in the HDD 26 and turning the power supply off. Due thereto, the supply of power to the power supply destinations continues from the time that the auxiliary power switch 17 is in an off position until a predetermined time elapses. The delay circuit 30 as well structures a portion of the control section of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power supply device comprising:
a main power switch switching between an on position and an off position when a user turns on and off the main power switch, and the main power switch being connected to an external power supply;
an auxiliary power switch switching between the on position and the off position by the user turning on and off the auxiliary power switch;
a power supplying switch connected in series between the main power switch and a power supply destination, the power supplying switch switching between supplying an electric power and stopping an electric power, the electric power originating from the external power supply;
a relay having a relay contact connected in parallel to the main power switch, and an excitation coil that, in an excited state, closes the relay contact, and, when the excitation coil is in a non-excited state, opens the relay contact;
a control section controlling the power supplying switch such that,
in a first case that the main power switch is turned to the on position by the user and the auxiliary power switch is then turned to the on position by the user, the control section outputs a control signal to turn on the power supplying switch,
in a second case that the auxiliary power switch is turned to the off position by the user and then the main power switch is turned to the off position by the user, the control section outputs the control signal to turn off the power supplying switch,
in a third case that the main power switch is turned to the off position by the user and then the auxiliary power switch is turned to the off position by the user, the control section maintains the power supplying switch in the on position from a timing at which the main power switch is turned to the off position until a timing at which the auxiliary power switch is then turned to the off position; and
a driving section that drives the relay such that,
in the first case that the main power switch is turned to the on position by the user and the auxiliary power switch is then turned to the on position by the user, the driving section drives the excitation coil to an excited state and maintains the excited state,
when the auxiliary power switch is turned to the off position by the user, the driving section drives the excitation coil to be in the non-excited state, and
in the third case that the main power switch is turned to the off position by the user and then the auxiliary power switch is turned to the off position by the user, the driving section drives the excitation coil to maintain the excited state,
wherein the auxiliary power switch remains in the on position while the electric power is being supplied to the power supplying switch, and
wherein, in response to the main power switch being in the off position, the electric power from the external power through the main power switch is cut off.

2. The power supply device of claim 1, wherein the driving section drives the relay so as to, when the auxiliary power switch is in the off position, the excitation coil is in the non-excited state after a predetermined time elapses from the auxiliary power switch being in the off position.

3. The power supply device of claim 1, wherein
the power supply destination is a storage section that stores information, and
the control section includes a processing executing device that causes information to be stored in the storage section.

4. The power supply device of claim 2, wherein
the power supply destination is a storage section that stores information, and
the control section includes a processing executing device causes information to be stored in the storage section.

5. The power supply device of claim 3, wherein, when the auxiliary power switch is in the on position and the main power switch is in the off position, the processing executing device further executes processing that stores information indicating that the auxiliary power switch was in the on position and the main power switch was in the off position.

6. The power supply device of claim 4, wherein, when the auxiliary power switch is in the on position and the main power switch is in the off position, the processing executing device further executes processing stores information indicating that the auxiliary power switch was in the on position and the main power switch was in the off position.

7. The power supply device of claim 5, wherein, when the main power switch is in the on position and the auxiliary power switch is in the on position and the power supplying switch is set in the on position, when the information has been stored, the processing executing device further executes processing that indicates that the auxiliary power switch was in the on position and the main power switch was in the off position.

8. The power supply device of claim 6, wherein, when the main power switch is in the on position and the auxiliary power switch is in the on position and the power supplying switch is set in the on position, when the information has been stored, the processing executing device further executes processing indicates that the auxiliary power switch was in the on position and the main power switch was in the off position.

* * * * *